(12) United States Patent
Bostick et al.

(10) Patent No.: US 10,038,937 B2
(45) Date of Patent: Jul. 31, 2018

(54) LOCATION-SPECIFIC AUDIO CAPTURE AND CORRESPONDENCE TO A VIDEO FILE

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 14/992,277

(22) Filed: Jan. 11, 2016

(65) Prior Publication Data

US 2017/0200465 A1 Jul. 13, 2017

(51) Int. Cl.
| | |
|---|---|
| *H04N 5/76* | (2006.01) |
| *H04N 21/4728* | (2011.01) |
| *G11B 27/10* | (2006.01) |
| *G06K 9/00* | (2006.01) |
| *G11B 27/031* | (2006.01) |
| *H04N 21/485* | (2011.01) |
| *H04N 21/8547* | (2011.01) |

(Continued)

(52) U.S. Cl.
CPC ..... *H04N 21/4728* (2013.01); *G06K 9/00718* (2013.01); *G11B 27/031* (2013.01); *G11B 27/10* (2013.01); *H04N 21/25841* (2013.01); *H04N 21/2743* (2013.01); *H04N 21/42203* (2013.01); *H04N 21/4524* (2013.01); *H04N 21/472* (2013.01); *H04N 21/4852* (2013.01); *H04N 21/8547* (2013.01)

(58) Field of Classification Search
CPC ... G11B 27/105; G11B 27/329; G11B 27/034; H04N 5/85; H04N 9/8042
USPC .......................................................... 386/241
See application file for complete search history.

(56) References Cited

U.S. PATENT DOCUMENTS

| | | | |
|---|---|---|---|
| 2011/0058051 A1* | 3/2011 | Jeon ......................... | G06F 3/012 |
| | | | 348/211.11 |
| 2012/0284755 A1* | 11/2012 | Keret ................. | H04N 21/6181 |
| | | | 725/62 |

FOREIGN PATENT DOCUMENTS

| | | |
|---|---|---|
| WO | 2014118319 A1 | 8/2014 |
| WO | 2015017428 A1 | 2/2015 |
| WO | 2015088484 A1 | 6/2015 |

\* cited by examiner

*Primary Examiner* — William C Vaughn, Jr.
*Assistant Examiner* — Daniel Tekle
(74) *Attorney, Agent, or Firm* — Cantor Colburn LLP

(57) ABSTRACT

An aspect includes gathering audio feeds captured from sources at a function. Each of the audio feeds is annotated with metadata identifying a time of capture and geo-coordinates of a location of the source. An aspect also includes mapping the audio feeds to a video feed captured by a first device at the function. The video feed is annotated with metadata identifying a time of capture and geo-coordinates of locations corresponding to images in the video feed. An aspect further includes identifying geo-coordinates of a location corresponding to an image in a focal point of view of a second device, searching the database for audio feeds in which the geo-coordinates of the sources are within a defined range of the geo-coordinates of the location corresponding to the image in the focal point of view, and transmitting, to the second device, a listing of user-selectable audio feeds resulting from the searching.

20 Claims, 4 Drawing Sheets

(51) Int. Cl.
*H04N 21/45* (2011.01)
*H04N 21/258* (2011.01)
*H04N 21/2743* (2011.01)
*H04N 21/422* (2011.01)
*H04N 21/472* (2011.01)

ЛОCATION-SPECIFIC AUDIO CAPTURE AND CORRESPONDENCE TO A VIDEO FILE

BACKGROUND

The invention relates generally to data processing, and more specifically, to location-specific audio capture and correspondence to a video file.

While capturing video at an event, an image sequence is recorded that typically includes audio. A video captured of a subject that is a long distance away can be modified for optimal viewing, e.g., by using a zoom function. However, the audio content associated with the video cannot be captured from a long distance without some distortion in the quality of the audio. In other words, the audio that is captured by a device is generally local to that device and is not necessarily local to the subject of the video captured by the device.

SUMMARY

According to an embodiment a method, system, and computer program product are provided for location-specific audio capture and correspondence to a video file. A method includes gathering, by a computer processor, gathering, by a computer processor, audio feeds captured from multiple sources at a function. Each of the audio feeds is annotated with metadata identifying a time of audio capture and geo-coordinates of a location of a respective source from which the audio feed is captured.

The method also includes mapping, in a database, the audio feeds to corresponding portions of a video feed that is captured by a first video recording device at the function. The video feed is annotated with metadata identifying a time of video capture and geo-coordinates of locations corresponding to subject images in the video feed. The mapping includes synchronizing the audio feeds to the corresponding portions of the video feed based on the metadata from the audio feeds and the video feed. The method further includes identifying geo-coordinates of a location corresponding to a subject image in a focal point of view of a user of a second video recording device at the function, searching the database for audio feeds from one or more of the sources in which the geo-coordinates of the one or more sources are within a defined range of the geo-coordinates of the location corresponding to the subject image in the focal point of view, and transmitting, to the second video recording device, a listing of user-selectable audio feeds resulting from the searching.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide localized audio provisioning services. The services map audio feeds collected from multiple dispersed sources to corresponding portions of a video feed based on the geographic proximity of devices capturing the audio to a particular geo-location of a subject image in the video feed. The services enable users of various media devices to select and receive localized audio feeds for synchronous presentation with a video feed or segment thereof.

Figure 1:
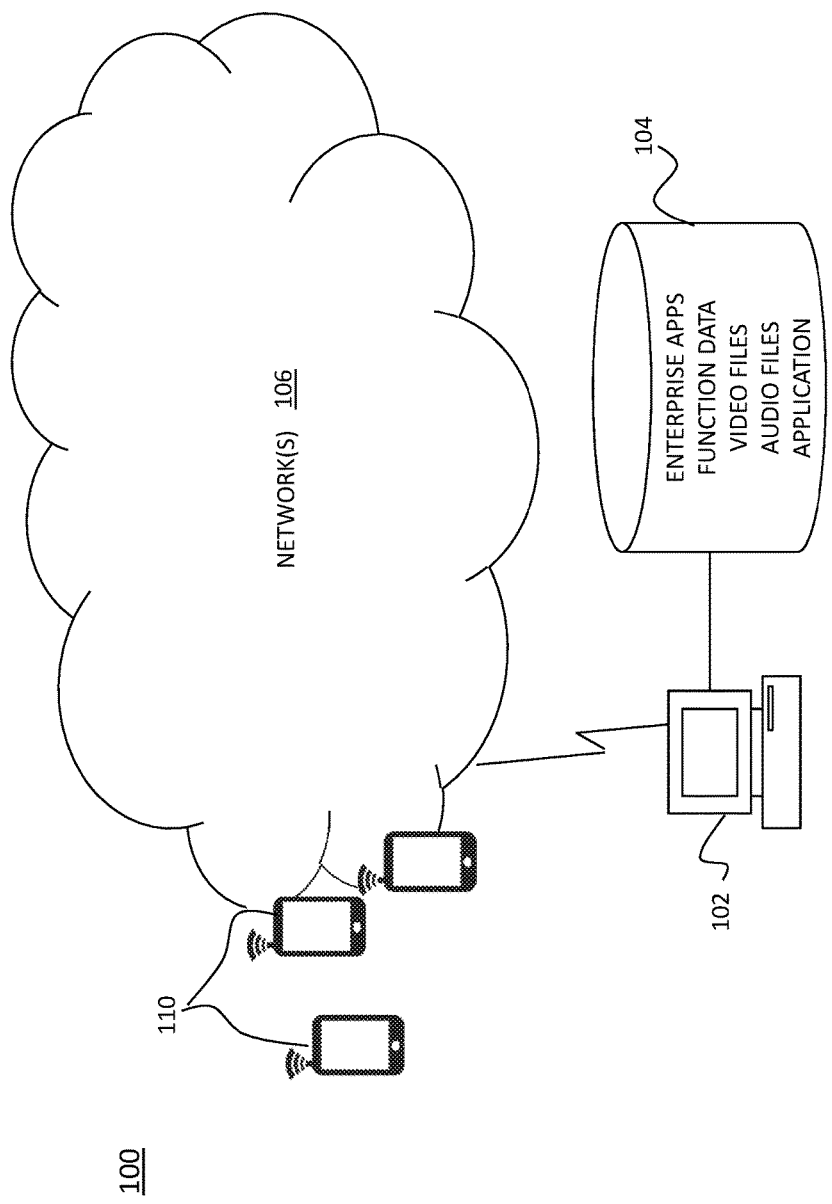
FIG. 1 depicts a system upon which localized audio provisioning may be implemented in accordance with an embodiment of the invention.

Turning now to FIG. 1, a system 100 upon which the localized audio provisioning services may be implemented will now be described in an embodiment. The system 100 includes a host system computer 102, a storage device 104 communicatively coupled to the computer 102, and devices 110, each of which is communicatively coupled to the host system computer 102 via one or more networks 106.

The host system computer 102 may be implemented as a high-speed computer processing device capable of handling the volume of activities associated with users of the localized audio provisioning services. In an embodiment, the host system computer 102 may be operated by an entity, such as an enterprise or organization, that hosts functions for individuals who are present at a venue associated with the entity. For example, the entity may host sporting events, concerts, or other functions. Alternatively, the host system computer 102 may be implemented as a server of a social network website that manages video uploaded to the website, as well as corresponding audio files. In either embodiment, at least a portion of the end users of the services may not be present at the event, as will be described further herein.

The storage device 104 is communicatively coupled to the host system computer 102. The storage device 104 may be implemented using a variety of devices for storing electronic information. It is understood that the storage device 104 may be implemented using memory contained in the host system computer 102 or it may be a separate physical device, as illustrated in FIG. 1. The storage device 104 may be logically addressable as a consolidated data source across a distributed environment that includes one or more networks, such as networks 106. Information stored in the storage device 104 is retrieved and manipulated via the host system computer 102, as well as by one or more devices 110 through a website of the host system computer 102.

The host system computer 102 executes an application for implementing the localized audio provisioning services described herein. The application may be stored in the storage device 104, as illustrated in FIG. 1. In an embodiment, the entity of the host system computer 102 hosts a website through which the localized audio provisioning services may be facilitated, as will be described herein. In an embodiment, the website may be accessed through networks 106 by devices 110 at a venue or function associated with the entity.

The devices 110 may be any portable, wireless communication devices, e.g., cell phone, smart phone, personal digital assistant, and computer tablet, to name a few. The devices 110 may be network-enabled through one or more networking agents, such as wireless network adapters, and may include short-range wireless communication capabilities and protocols, such as BLUETOOTH or WI-FI, as well as long-range communication capabilities. In an embodiment, other components may be enabled on the devices 110, such as global positioning system components and multimedia (audio, video, and still images) capturing components. In an embodiment, at least a portion of the devices are present at an event or function hosted by an entity. In addition, another portion of the devices may be remotely located from the event, as will be described further herein.

Networks 106 may include a combination of one or more different types of networks (e.g., local area network, wide area network, Internet, satellite, or terrestrial network, to name a few).

In an embodiment, the entity of FIG. 1 may establish settings for implementing the localized audio provisioning services through the application. For example, the entity may set preferences that define the events for which the localized audio provisioning services are offered, as well as venue- and event-related information. For example, the entity may task various individuals at an event with recording audio (via, e.g., the devices 110) from different specified locations during the course of the event. Alternatively, or in addition thereto, the entity may provide a destination address of a storage facility (e.g., storage device 104) that enables individuals at the event to upload or submit their captured audio from the event. Alternatively, or in addition thereto, the entity may deploy various audio recording devices (e.g., one or more devices 110) that are dispersed around the event at fixed locations.

The audio received from these devices may be live audio feeds or the audio may be submitted after the function. In any event, the geo-location coordinates of these devices are tracked by the application and stored along with an identifier of the capturing device.

In a further embodiment, the settings may also include dates and times of the function, such that the application can track and synchronize the captured audio with a corresponding video at a function. This feature is described further herein.

Figure 2:
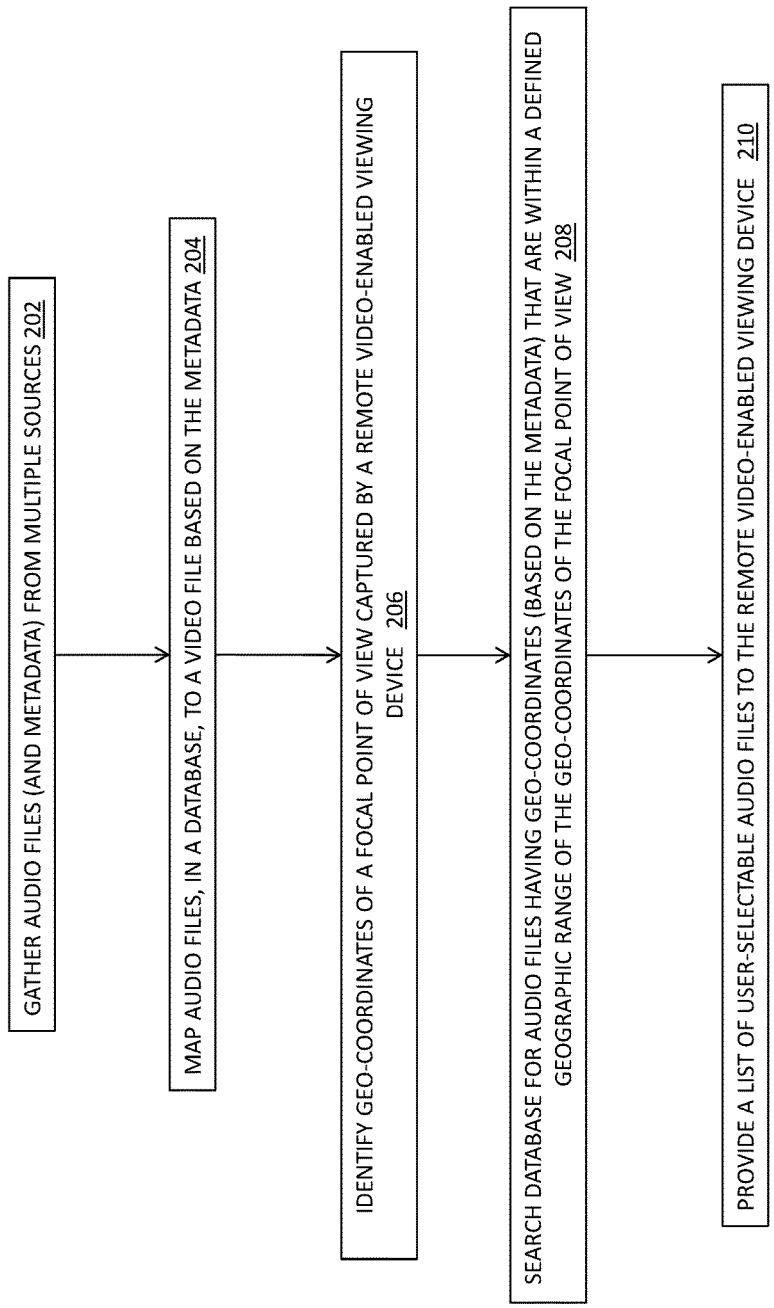
FIG. 2 depicts a flow diagram of a high-level process for implementing localized audio provisioning in accordance with an embodiment of the invention.

Turning now to FIG. 2, a process for implementing the localized audio provisioning services will now be described in an embodiment. In block 202, the application gathers audio feeds captured at a function from multiple sources. The sources may include one of more of the devices 110. Each of the audio feeds is annotated with metadata identifying a time of audio capture (e.g., timestamp) and geo-coordinates of a location of the source from which the audio feed is captured.

In block 204, the audio feeds are mapped to a video feed captured at the function. The video feed may be captured by a video recording device associated with the entity hosting the event. For example, the video feed may be a live televised or Internet-streamed feed. The video feed is annotated with metadata identifying a time of video capture and a set of geo-coordinates corresponding to the locations of subject images in the video feed. The mapping includes synchronizing the audio feeds to corresponding portions of the video feed based on the metadata from the audio feeds and the video feed. The audio feeds and corresponding video feed may be mapped via database structures, as described in FIG. 3, and stored in the storage device 104.

In an embodiment, the application also annotates the video feed with a ranking of the quality of each of the audio feeds. The ranking is a value specifying a quality indicator of the audio feeds based on one or more measurable aspects. For example, the quality indicator may account for distortion, competing background noise, network signal interruptions, etc.

In one embodiment, the application is implemented by a server of a social media website, and the video feed and corresponding audio feeds are accessible by end users of the social media network. In this embodiment, at least a portion of the ranking of the audio feeds may be generated from the community of social media users. In one example, an audio feed ranking may be submitted by one community user and conveyed directly to another community user in response to a request from the submitting community user.

At block 206, the application identifies geo-coordinates of a location corresponding to a subject image in a focal point of view of a device with respect to the function. In one embodiment, the device is a second video recording device that is present at the function and may be implemented as one of the devices 110. In this embodiment, the focal point of view may be established when a user of the device implements a zoom function on a select object or area. The application can estimate a distance between the second video recording device and a location of the subject image of the focal point of view. The subject image can be identified, e.g., using image recognition techniques. In this embodiment, the subject image may be compared to images from the video feed. Using triangulation techniques, e.g., in conjunction with the distance and the geo-coordinates of the second video recording device, the application can determine the geo-coordinates of the subject image in the focal point of view.

In another embodiment, the device is an Internet protocol-enabled television that is not present at the function. In this embodiment, the location of a subject image in a focal point of view of a viewer at the remote television may be established by receiving television software-generated data indicating where on the television screen the viewer's eyes are trained. In a further embodiment, the device is a computer device (e.g., a general-purpose desktop or laptop), which is not present at the function. The subject image in a focal point of view of a user of the computer device may be established, e.g., by touchscreen input received from the user of the computer.

At block 208, the application searches the database for audio feeds having geo-coordinates that are within a defined range of the geo-coordinates of the location corresponding to the subject image in the focal point of view.

At block 210, the application provides, to the device (e.g., the second video recording device, television, or computer) a listing of user-selectable audio feeds that resulted from the search. The search results contain audio feeds that are deemed to be local to the subject image of the focal point of view. The listing of the user-selectable audio feeds may also include an indicator of the ranking of the quality of each of the user-selectable audio feeds. The ranking may be provided as a visual indicator displayed at the device.

Figure 3:
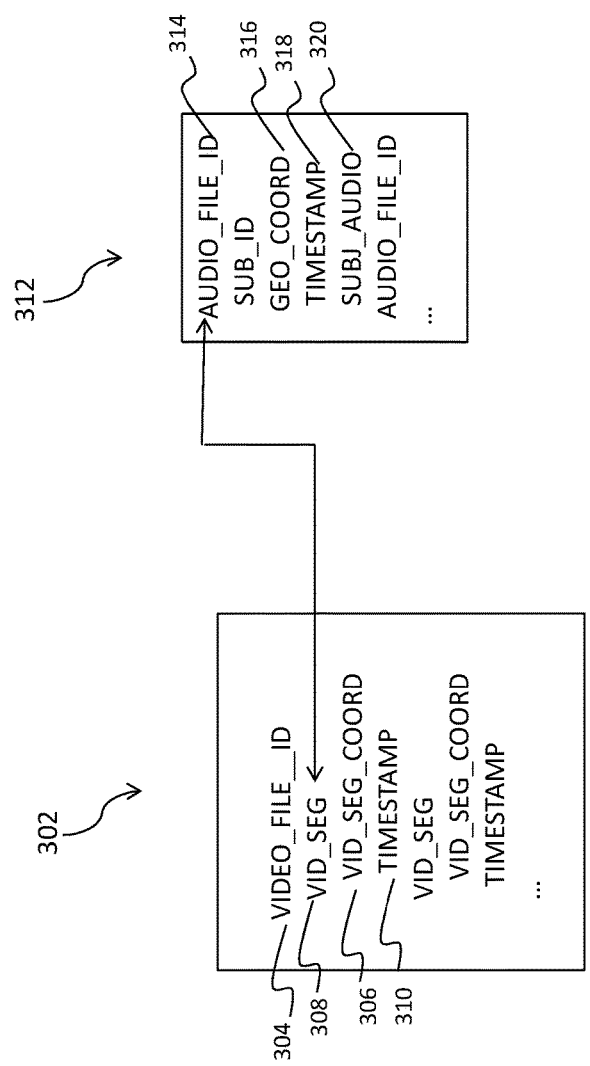
FIG. 3 depicts database structures for establishing a correspondence between audio feeds and a video feed according to an embodiment of the invention.

In an embodiment, these mappings of audio feeds to the video feed can be implemented at least in part through database structures 300, as will now be described in FIG. 3. In FIG. 3, a set of database structures 300 for facilitating the local audio provisioning services will now be described. In FIG. 3, a structure 302 includes elements that identify video feeds. The video feeds may be multi-media files generated at one or more functions. The structure 302 includes an identifier 304 of the video feed (VIDEO_FEED_ID), geo-coordinates of view points (VID_SEG_COORD) 306 for corresponding video segments (VID_SEG) 308, as well as timestamps (TIMESTAMP) 310 corresponding to the video segments. A video segment may be a video frame or group of frames of the video feed. The timestamps indicate the time of video capture. The structure 302 may store this information for multiple video feeds, each of which is distinguished by the identifier 304.

A structure 312 includes elements that identify audio feeds. The structure 312 includes an identifier (AUDIO_FEED_ID) 314 of each audio feed, geo-coordinates of the device (GEO_COORD) 316 capturing the audio feed, and a timestamp (TIMESTAMP) 318 in which the audio feed is captured. In an embodiment, if the audio capturing device is a stationary device that is dispersed at a fixed location and managed by the entity of FIG. 1, then the geo-coordinates of the device may serve as its identifier. In addition, the structure 312 includes a subject of the audio (SUBJ_AUDIO) 320. For example, if the function is a sporting event such as a football game, the subject of the audio may be identified as an interception. The subject is tagged in the audio feed as metadata and may be determined, e.g., based on image recognition techniques, entries made by the person capturing the audio feed, and/or crowd sourced by those who review the audio in a social media setting. As shown in FIG. 3, an audio feed may be mapped to a portion (e.g., a video segment 308) of a video feed via the audio feed ID 314.

Figure 4:
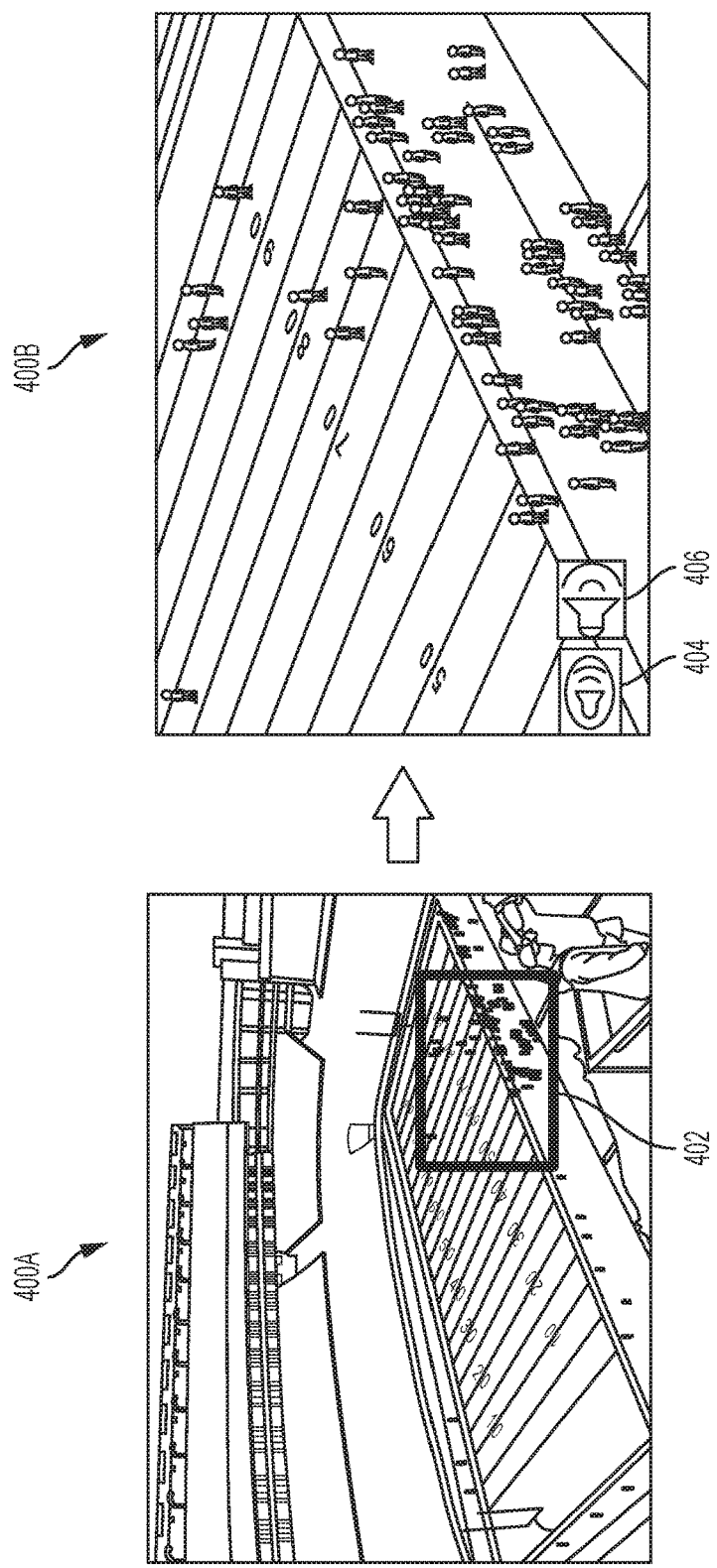
FIG. 4 depicts a user interface screen of a focal viewpoint of a video captured by a device, and a user interface screen of a zoomed in portion of the video including an indication of a corresponding localized audio feed in accordance with an embodiment of the invention.

Turning now to FIG. 4, a user interface screen 400A depicts a sample focal point of view captured from a device (e.g., one of devices 110). The user selects a zoom function with respect to a portion 402 of the view. The zoom function causes the device to present an enlargement of the portion 402, as shown in user interface screen 400B. The focal point of view may be used to determine a corresponding one or more audio feeds (e.g., via the database structures 300 and mapping process). As shown in screen 400B, an icon 404 is displayed reflecting that the audio attributed to the user's own recorded video is in operation at the device 110. In addition, an option 406 is provided on the screen 400B through which the user may select a localized audio feed that corresponds to localized audio captured by devices at the zoomed-in location. Upon selection, the localized audio feed is presented on the device 110 in lieu of the originally recorded audio (icon 404). In an embodiment, if there are multiple audio feeds that correspond to the portion 402, this option 406 upon selection may result in a listing of audio feeds to choose from, along with a ranking of the audio feeds based on corresponding quality indicators.

Technical effects and benefits include an enhanced video experience in which audio feeds captured from multiple sources at a venue are mapped to corresponding video elements at the venue, such that video recording device users who are at a distance from the subject of the video can experience localized audio corresponding to the video.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
  gathering, by a computer processor, audio feeds captured from multiple sources at a function, each of the audio feeds annotated with metadata identifying a time of audio capture and geo-coordinates of a location of a respective source from which the audio feed is captured;
  mapping, by the computer processor in a database stored in a memory, the audio feeds to corresponding portions of a video feed that is captured by a first video recording device at the function, the video feed annotated with metadata identifying a time of video capture and geo-coordinates of locations corresponding to subject images in the video feed, wherein the mapping includes synchronizing the audio feeds to the corresponding portions of the video feed based on the metadata from the audio feeds and the video feed;
  identifying, by the computer processor, geo-coordinates of a location corresponding to a subject image in a focal point of view of a user of a second video recording device at the function;
  searching by the computer processor, the database for audio feeds from one or more of the sources in which the geo-coordinates of the one or more sources are within a defined range of the geo-coordinates of the location corresponding to the subject image in the focal point of view;
  and transmitting, by the computer processor to the second video recording device over a network, a listing of user-selectable audio feeds resulting from the searching.

2. The method of claim 1, wherein the geo-coordinates of the location corresponding to the subject image in the focal point of view are determined via an image recognition technique, in response to a zoom function performed at the second video recording device, the image recognition technique comparing aspects of the subject image in the focal point of view to aspects of images captured in the video feed.

3. The method of claim 1, wherein the mapping is implemented via a social media website, and the video feed and corresponding audio feeds are accessible to end users through the social media website.

4. The method of claim 3, further comprising:
  annotating each of the audio feeds with a ranking specifying a quality of the audio feeds, wherein at least a portion of the ranking is determined by input received from the end users of the social media website.

5. The method of claim 1, further comprising ranking each of the audio feeds based on a quality indicator, wherein providing a listing of the user-selectable audio feeds includes providing the ranking along with the listing of each of the user-selectable audio feeds.

6. The method of claim 1, wherein the multiple sources include audio capturing devices dispersed around an area defined by the function.

7. The method of claim 1, further comprising determining the geo-coordinates of the locations corresponding to subjects of the subject images in the video feed, the determining including, for each of the subject images in the video feed:
  estimating a distance between a location of the first video recording device and the location of a subject in the subject image; and
  calculating the geo-coordinates of the subject using a triangulation technique based on the distance and the geo-coordinates of the first video recording device.

8. A computer system, comprising:
  a memory having computer readable instructions; and
  a processor configured to:
    gather audio feeds captured from multiple sources at a function, each of the audio feeds annotated with metadata identifying a time of audio capture and geo-coordinates of a location of a respective source from which the audio feed is captured;

map, in a database of the memory, the audio feeds to corresponding portions of a video feed that is captured by a first video recording device at the function, the video feed annotated with metadata identifying a time of video capture and geo-coordinates of locations corresponding to subject images in the video feed, wherein the mapping includes synchronizing the audio feeds to the corresponding portions of the video feed based on the metadata from the audio feeds and the video feed;

identify geo-coordinates of a location corresponding to a subject image in a focal point of view of a user of a second video recording device at the function;

search the database for audio feeds from one or more of the sources in which the geo-coordinates of the one or more sources are within a defined range of the geo-coordinates of the location corresponding to the subject image in the focal point of view; and transmit, to the second video recording device, a listing of user-selectable audio feeds resulting from the searching.

9. The computer system of claim 8, wherein the geo-coordinates of the location corresponding to the subject image in the focal point of view are determined via an image recognition technique, in response to a zoom function performed at the second video recording device, the image recognition technique comparing aspects of the subject image in the focal point of view to aspects of images captured in the video feed.

10. The computer system of claim 8, wherein the mapping is implemented via a social media website, and the video feed and corresponding audio feeds are accessible to end users through the social media website.

11. The computer system of claim 10, wherein the processor is further configured to:

Annotate each of the audio feeds with a ranking specifying a quality of the audio feeds, wherein at least a portion of the ranking is determined by input received from the end users of the social media website.

12. The computer system of claim 8, wherein the processor is further configured to rank each of the audio feeds based on a quality indicator, wherein providing a listing of the user-selectable audio feeds includes providing the ranking along with the listing of each of the user-selectable audio feeds.

13. The computer system of claim 8, wherein the multiple sources include audio capturing devices dispersed around an area defined by the function.

14. The computer system of claim 8, wherein the processor is further configured to determine the geo-coordinates of the locations corresponding to subjects of the subject images in the video feed, the determining including, for each of the subject images in the video feed:

estimating a distance between a location of the first video recording device and the location of a subject in the subject image; and calculating the geo-coordinates of the subject using a triangulation technique based on the distance and the geo-coordinates of the first video recording device.

15. A computer program product comprising a computer readable storage medium having program instructions embodied therewith, wherein the computer readable storage medium is not a transitory signal, the program instructions executable by a computer processor to cause the computer processor to perform a method comprising:

gathering audio feeds captured from multiple sources at a function, each of the audio feeds annotated with metadata identifying a time of audio capture and geo-coordinates of a location of a respective source from which the audio feed is captured;

mapping, in a database, the audio feeds to corresponding portions of a video feed that is captured by a first video recording device at the function, the video feed annotated with metadata identifying a time of video capture and geo-coordinates of locations corresponding to subject images in the video feed, wherein the mapping includes synchronizing the audio feeds to the corresponding portions of the video feed based on the metadata from the audio feeds and the video feed;

identifying geo-coordinates of a location corresponding to a subject image in a focal point of view of a user of a second video recording device at the function;

searching the database for audio feeds from one or more of the sources in which the geo-coordinates of the one or more sources are within a defined range of the geo-coordinates of the location corresponding to the subject image in the focal point of view; and transmitting, to the second video recording device, a listing of user-selectable audio feeds resulting from the searching.

16. The computer program product of claim 15, wherein the geo-coordinates of the location corresponding to the subject image in the focal point of view are determined via an image recognition technique, in response to a zoom function performed at the second video recording device, the image recognition technique comparing aspects of the subject image in the focal point of view to aspects of images captured in the video feed.

17. The computer program product of claim 15, wherein the mapping is implemented via a social media website, and the video feed and corresponding audio feeds are accessible to end users through the social media website.

18. The computer program product of claim 17, wherein the program instructions are further executable to perform:

annotating each of the audio feeds with a ranking specifying a quality of the audio feeds, wherein at least a portion of the ranking is determined by input received from the end users of the social media website.

19. The computer program product of claim 15, wherein the program instructions are further executable to perform ranking each of the audio feeds based on a quality indicator, wherein providing a listing of the user-selectable audio feeds includes providing the ranking along with the listing of each of the user-selectable audio feeds.

20. The computer program product of claim 15, wherein the multiple sources include audio capturing devices dispersed around an area defined by the function.

* * * * *